Oct. 29, 1929.  K. JURKOVSKI  1,733,489
DISINTEGRATOR
Filed March 16, 1926

INVENTOR
Karl Jurkovski
BY
ATTORNEY

Patented Oct. 29, 1929

1,733,489

UNITED STATES PATENT OFFICE

KARL JURKOVSKI, OF BEMIDJI, MINNESOTA

DISINTEGRATOR

Application filed March 16, 1926. Serial No. 95,006.

This invention relates to disintegrators and has as its main object to provide a device to be used to cut up into small pieces, vegetables and fruits to be consumed by cattle.

A further object is in the provision of means whereby the distintegrators are removable and replaceable.

A still further feature of the invention is in the provision of means to keep the cutting elements clean and clear in order to avoid clogging of the machine.

Another characteristic of the disclosure is to provide a device to cause the distintegrated matter to come to the front of the apparatus, where it is easily accessible and readily removed.

These and other objects are accomplished by the novel construction, combination and arrangement of parts, hereinafter described and illustrated in the accompanying drawing, in which:—

Figure 1:
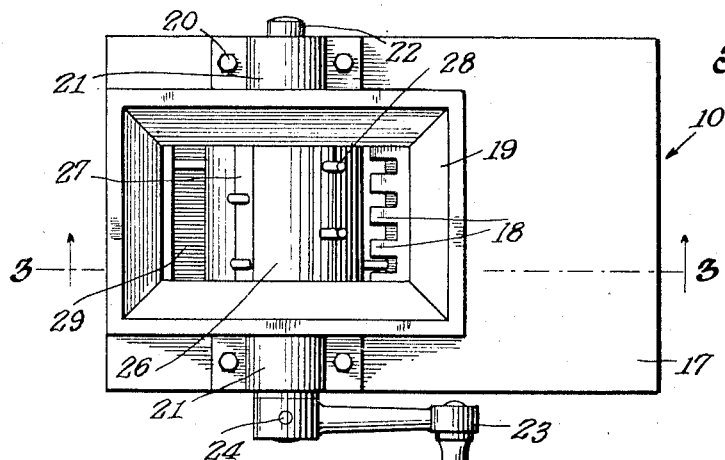
Figure 1 is a top plan of the preferred embodiment of the device.
Figure 2:
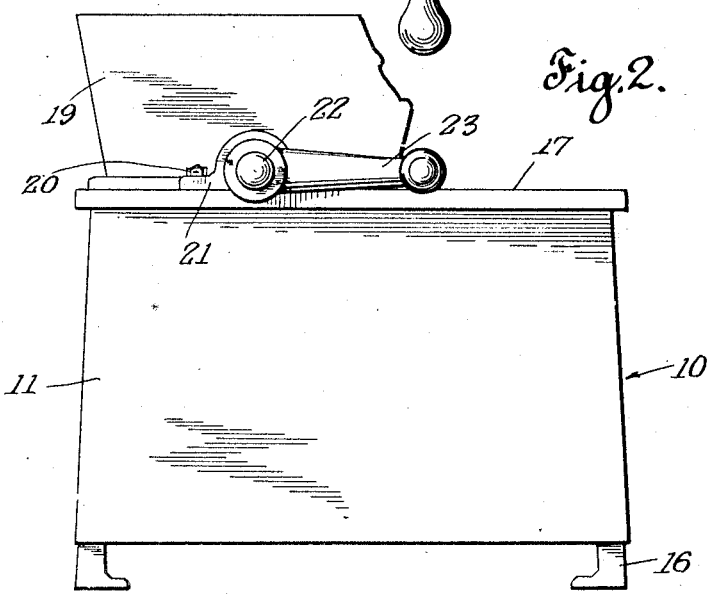
Figure 2 is a side elevational view thereof.
Figure 3:
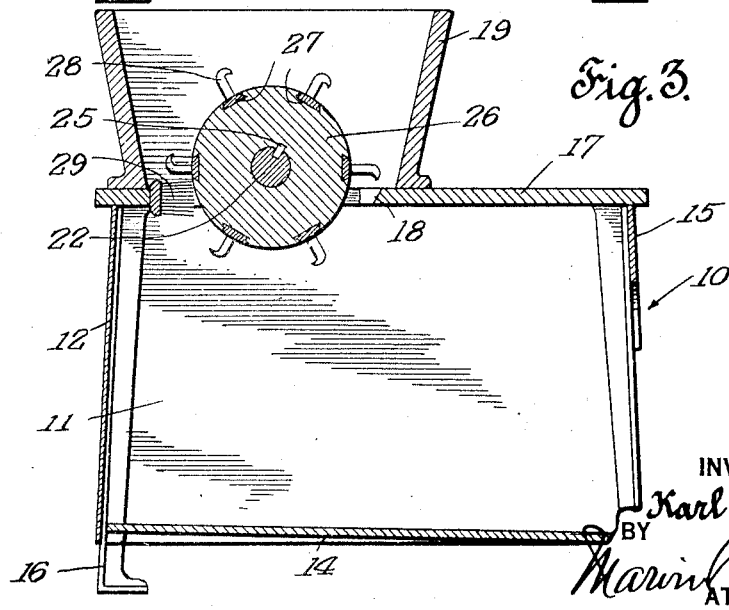
Figure 3 is a transverse sectional view taken on line 3—3 of Figure 1.

Refering more in detail to the drawing:—

The numeral 10 generally designates a cabinet base having side walls 11, a rear wall 12, an inclined bottom wall 14 and a front wall 15 having an opening therein meeting the inclined wall 14, supported by legs 16.

Fixed on the receptacle 10 is a top plate 17 having a rectangular opening in its face and a recessed ledge 18 forming one side of the opening. Mounted on the top 17 is a hopper 19 positioned to surround the opening in the plate.

Rigidly secured to the plate 17, on both sides of the hopper 19 by screws 20 is a pair of brackets 21 to receive a shaft 22 passing through cut out portions in the hopper 19 and having at one end, a crank handle 23 held fixedly by a pin 24.

Keyed to the shaft 22, as at 25, is a cylinder 26 having a plurality of undercut equally spaced slots in its outer periphery to slidably receive therein mating bars 27.

Set in the bars 27 is a plurality of cutting elements 28 having pointed hook-shaped forwardly extending bent ends. When the cutters 28 are all in place, they are arranged in staggered relation, so that they may pass through the recesses in the ledge 18 when the cylinder 26 is revolved. Mounted on the side of the opening in the top 17 opposite the recessed ledge 18 is a brush 29 positioned to contact with the cutters 28 and keep the same clean.

It will be noted that the faces of the cutting edges of the ledge 18, which cooperate with the cutting elements 28, are inclined upwardly and rearwardly and that the cutting edges are at the bottom of the plate 17.

In operation, the vegetables to be disintegrated are placed in the hopper 19. They are then pressed downwardly and the crank 23 is turned. This action revolves the cylinder 26, by the key 25, causing the cutting elements 28 also to rotate, thereby dismembering the vegetable matter and carrying a portion of it through the recesses in the ledge 18 into the receptacle 10, where it comes to the front, because of the inclined floor 14; it now being readily removed through the opening in the front plate 15 of the cabinet.

From the foregoing it may be seen that a simple and effective, manually operable disintegrator has been disclosed that may be used to cut into small pieces, vegetables and other similar dietaries.

Having thus described my invention, what I claim as new and desire to secure by Letters Patent, is:—

A distintegrator comprising a cabinet, a top plate on said cabinet, said top plate having an opening, a ledge at one side of said opening provided with recesses having cutting edges their faces being inclined upwardly and rearwardly away from said cutting edges, a shaft mounted on said plate, a cylinder secured to said shaft having a plurality of longitudinal undercut slots, bars removably secured in said slots, spaced cutting elements carried by each of said bars and adapted to pass through the recesses of said ledge in cooperative cutting relation with the cutting edges thereof, and a brush mounted on the opposite edge of said opening.

In witness whereof I have affixed my signature.

KARL JURKOVSKI.